Patented Mar. 3, 1936

2,032,994

UNITED STATES PATENT OFFICE 2,032,994

BISMUTH CAMPHOLATE

Louis Lecoq, Levallois, France

No Drawing. Application October 4, 1933,
Serial No. 692,225

2 Claims. (Cl. 260—11)

My invention relates to the manufacture of bismuth salts soluble in numerous organic solvents and in vegetal oils.

An object of my invention is the new compound, bismuth campholate, having the property, highly desired but not perfectly obtained up to the present time, of yielding solutions in oils that are very stable and that remain unaltered after a sterilization, i. e. after being heated to 110–115° C. for 30 to 40 minutes.

Various bismuth salts have already been proposed with a view to prepare such desired solutions; thus, the bismuth salt of carbethoxymethylnonanoic acid is commonly used. Also acids such as butylthioloic acid, phenylpropionic acid, hexahydrobenzoic acid and camphor-carbonic acid have been resorted to.

The known acids have various drawbacks arising either from their high cost, or from the poor solubility of their salts, or from their nasty smell, or from the impossibility of obtaining from them, a bismuth salt in crystalline form, or finally from their readiness to decomposition; thus camphor-carbonic acid, which is an acid of β-ketonic character, loses easily carbon dioxide and leaves a deposit of bismuth oxides.

Now, I have found that among acids of low commercial cost in the series of camphor, there is a compound leading to new, useful and unexpected results, to wit campholic acid.

Campholic acid whose formula is:

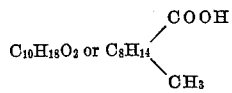

may be prepared by causing camphor to fix one molecule of water, according to the reaction

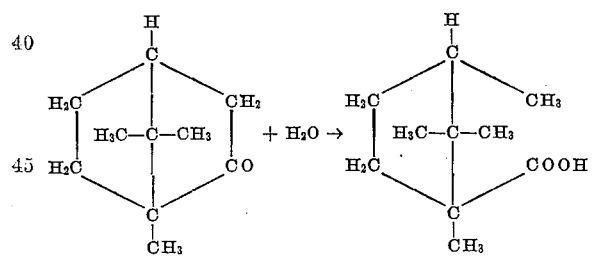

Campholic acid was studied by the following authors: (Delalande, Ann. 38, 337, (1841)—Malin, Ann. 145, 201 (1867)—Kachler, Ann. 162, 259 (1872)—Montgolfier, Ann. ch. (5) 14, 99 (1878)—Errera, Gazz. chim. 221, 205 (1892)—Guerbet, Bull. (3), II, 426, 610 (1894), Ann. ch. (7) 4, 289 (1895)—Haller & Blanc Compt. rend. 130, 376 (1900).

It is a white crystalline compound, melting at 105–106° C. having an anilide melting at 91° C. and possessing the very remarkable property that it may be esterified only with utmost difficulty.

The following is an example illustrating the preparation of bismuth salt from said acid, but it is to be understood that the invention is not limited thereby.

51 grams of compholic acid are dissolved in 300 cc. of normal sodium hydroxide lye; 130 cc. of glycerin are added to the solution and the whole is filtered. On the other hand, a solution is prepared by incorporating bismuth nitrate in such an amount of water containing 30 per cent of glycerin that in the final solution 500 cc. contain 100 grams of bismuth nitrate. One uses 230 cc. of the solution instead of 242 cc. theoretically required, that is 45 parts by weight of bismuth nitrate, so as to leave a slight excess of sodium campholate unaltered.

The solution of sodium campholate is cooled in the neighbourhood of 0° C. with careful stirring, then bismuth nitrate solution is introduced carefully into the solution being cooled and stirred. The reaction products are allowed to stand during about two hours; the mass thickens; it is extracted carefully with ether. The ether solution is allowed to settle, is dried on sodium sulphate and ether is evaporated leaving as a residue, with a quantitative yield, a compound which is normal bismuth campholate with two molecules of water; it contains 27.69 per cent of metal and 4.79 per cent of constitution water; it corresponds to the formula:

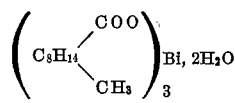

This salt may crystallize through slow evaporation of the ether or out of aqueous acetone. It has the remarkable property of being soluble in glycerides such as vegetable oils (olive oil, almond oil, poppy seed oil, etc. . .) and the proportion of dissolved salt is commonly of 15 per cent by weight of the final solution, or even more.

In the above described process, glycol or any other hydroxy-compound adapted to prevent like glycerin, dissociation of bismuth salts, may be used instead of glycerin without departing from the spirit of the invention.

The bismuth salt, prepared as above described, is not mentioned in chemistry literature and the fact that camphor-carbonic acid which has in its molecule, a ketone function convertible into enolic form, yields an oil soluble salt, could not allow of foreseeing that campholic acid which has in its molecule only an acid function and whose structure comprises only one pentagonal ring while camphor carbonic acid has a double pentagonal ring, would give a salt showing the most remarkable properties of solubility above referred to.

In practice, before incorporation in oil, bismuth campholate is first dehydrated according to any suitable or approved practice; for instance it is dried in vacuo while being heated to about 60–70° C. on the water-bath. It yields highly stable solutions in oils, said solutions having by reason of the great solubility of the salt a high content in active bismuth. Concerning stability, it may be pointed out that an oil solution of bismuth campholate was maintained at 110° C. during an hour and still retained a perfect limpidity. It is well-known that bismuth oily solutions used up to the present time are not quite stable and that frequently after a long storage and/or after sterilization, they become turbid and yield deposits so that they can no longer be used for injections; especially it is known that bismuth camphor-carbonate is liable to decompose into carbon dioxide and bismuth oxides; the latter precipitate in the bulb containing the original solution while carbon dioxide is accumulated under pressure and is manifested by a blast when the bulb is opened for use. Numerous actual tests have shown that bismuth campholate has none of those disadvantages. Accordingly and as it has been confirmed by numerous tests, an oil solution thereof is a highly valuable medicine in the treatment of diseases in which bismuth is efficient, for instance syphilis. Obviously bismuth campholate may be associated in the oil solution with other beneficial compounds such as camphor-containing materials, bismuth salts already in use etc...

What I claim is:

1. A compound consisting in a bismuth salt a campholic acid.

2. A hydrated crystallizable bismuth compound having the following formula

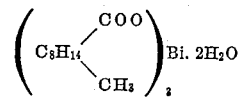

LOUIS LECOQ.